United States Patent
Krol et al.

(10) Patent No.: US 7,041,867 B2
(45) Date of Patent: May 9, 2006

(54) LAMINATE MATERIAL FOR THE PROTECTION OF BODY PARTS AND DEVICE COMPRISING SUCH LAMINATE

(75) Inventors: Johannes Andreas Wilhelmus Krol, Berg en Dal (NL); Leonardus Johannes Maria van der Mijn, Apeldoorn (NL)

(73) Assignee: Verenigde Bedrijven Nimco B.V., Berg en Dal (NL)

( * ) Notice: Subject to any disclaimer, the term of this patent is extended or adjusted under 35 U.S.C. 154(b) by 235 days.

(21) Appl. No.: 10/468,792

(22) PCT Filed: Feb. 22, 2002

(86) PCT No.: PCT/NL02/00115

§ 371 (c)(1),
(2), (4) Date: Aug. 22, 2003

(87) PCT Pub. No.: WO02/066187

PCT Pub. Date: Aug. 29, 2002

(65) Prior Publication Data

US 2004/0097400 A1    May 20, 2004

(30) Foreign Application Priority Data

Feb. 22, 2001  (NL) .................................... 1017432

(51) Int. Cl.
*A61F 13/00* (2006.01)
(52) U.S. Cl. .............................. 602/46; 602/53; 2/455; 2/456; 428/298

(58) Field of Classification Search ................... 602/4, 602/5, 41–43, 46, 60, 61; 2/455, 24, 467, 2/23, 412, 59, 62
See application file for complete search history.

(56) References Cited

U.S. PATENT DOCUMENTS

| 4,530,873 A | 7/1985 | Okada |
| 4,743,488 A | 5/1988 | Jones et al. |
| 5,071,698 A | 12/1991 | Scheerder |
| 6,362,387 B1 * | 3/2002 | Carlson et al. ............... 602/41 |

OTHER PUBLICATIONS

"Cellular Materials to Composites" Encyclopedia of Polymer Science and Engineering, vol. 3, John Wiley & Sons, 1964, New York, © 1985.
J. de Vries, PhD, MD. "Semi Orthopaedic Footwear Versus Orthopaedic Footwear: An Appropriate Alternative in Diabetic patients?", Jul. 12, 1999.

* cited by examiner

*Primary Examiner*—Kim M. Lewis
(74) *Attorney, Agent, or Firm*—Browdy and Neimark, PLLC

(57) ABSTRACT

A laminate material includes an upper layer (I) and a lower layer (II) which is joined to the upper layer over substantially the entire surface thereof. The upper layer (I) includes a thin layer of leather material (1), and the lower layer (II) is a material which can be stretched in two directions. The lower layer (II) includes at least one support layer (3) which is resilient in two directions and has at least two sorts of interwoven fibres, at least one type of fibres being produced from an elastic substance, as well as a layer (5) of a compressible substance which is joined to the support layer over substantially the entire surface thereof and is resilient in three mutually perpendicular directions. Such laminate material can be used in a device for protecting a body part of a human or an animal.

24 Claims, 1 Drawing Sheet

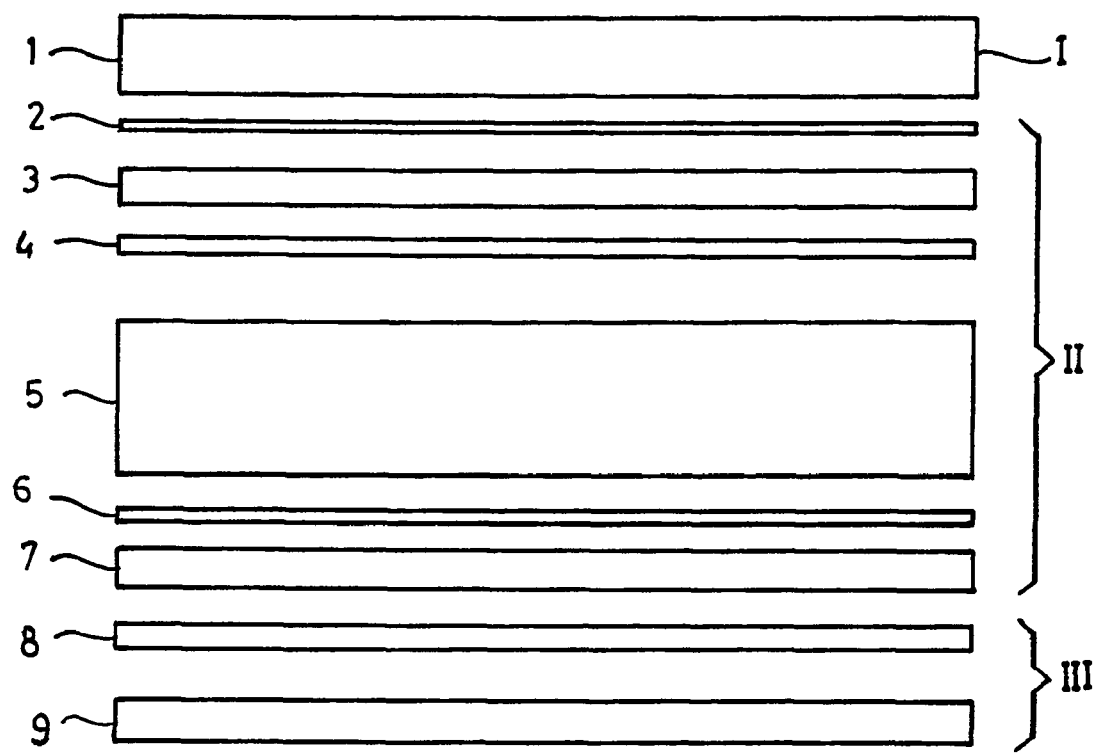

LAMINATE MATERIAL FOR THE PROTECTION OF BODY PARTS AND DEVICE COMPRISING SUCH LAMINATE

The present invention relates to a laminate material, comprising an upper layer and a lower layer which is joined to the upper layer over substantially the entire surface thereof, the upper layer comprising a thin layer of leather material, and the lower layer comprising a layer of material which can be stretched in two directions.

FR-A-2 680 478 describes a laminate material in which a layer of leather with a thickness of between 0.2 and 1.0 mm is adhesively bonded to a prestressed lower layer of stretchable material. The stretchable material is either a fabric comprising an elastomer or a layer of rubber. The material has a good elasticity and combines a number of advantageous properties of leather and stretchable material, and is used, for example, for shoes.

However, none of the known laminate materials described is able to simultaneously satisfy the requirements of flexibility, shape-restoring properties, protection for body parts which are to be covered and breathability without eliminating the advantages of the leather layer. These demands are imposed, for example, on shoes or other items of clothing for people with diabetes, deformities or other disorders which impair the circulation or whose skin is very easily damaged otherwise.

The present invention provides a solution to the above problem, and to this end is characterized in that the lower layer comprises at least one support layer which can be stretched in two directions and comprises at least two sorts of interwoven fibres, at least one type of fibres being produced from an elastic substance, as well as a layer of a compressible substance which has been joined to the support layer over substantially the entire surface thereof and can be stretched in three mutually perpendicular directions.

In this way it is possible, for the first time, to create a laminate material which is simultaneously flexible, shape-restoring, soft and protective, and also breathable. The support layer comprising interwoven elastic fibres and other fibres is primarily responsible for flexibility and more rapid recovery of the leather material, the layer of compressible substance is responsible primarily for softness and protection, while it is in part the combination of the two which provides the shape-restoring property. The breathability is ensured by suitable selection of breathable substances for the two part-layers of the lower layer.

In this way, an extremely suitable and comfortable material is created for, for example, shoes for diabetics. Other applications will be dealt with in more detail below.

The laminate material according to the invention is stretchable and has elastic properties which are comparable to those of the thinnest leather layers. This will be dealt with in more detail in the discussion of the Examples.

The elastic substance can be selected from the usual elastic substances, for example the substance which bears the trade name Lycra or products of a similar type. Other elastomers are also possible, in which case, if necessary, the ratio to the other fibres used has to be modified on the basis of the elasticity and other mechanical properties of the elastomer.

The compressible substance advantageously comprises a substantially open-cell cured plastic foam. This material combines softness and flexibility, and therefore also a protective action against external influences, with the required breathability. Moreover, it is extremely lightweight, making it beneficial and comfortable for any body parts which are to be protected by the material.

In a particular embodiment of the laminate material according to the invention, the plastic foam comprises latex foam. Latex is a suitable material which is very simple to foam and cure to produce a very lightweight yet flexible, resilient and elastic open-cell cured latex foam. Nevertheless, other breathable, lightweight plastics materials are conceivable, such as polyester sponge and the like.

The open-cell cured latex foam preferably has a density of between 25 and 35 $kg/m^3$. This density gives a good compromise between the weight of the material, flexibility and strength. Nevertheless, other densities are also conceivable. For example, if the requirement for protection is more important, it is possible to use a denser and heavier foam.

The layer which can be compressed in three mutually perpendicular directions preferably has a thickness of between 0.5 and 2.5 mm, more preferably of between 1.0 and 2.0 mm. At this thickness, a protective action which is sufficient in most instances is obtained. Therefore, partly in combination with the other layers of the laminate material, a material which is suitable for many different applications and is not too thick is formed. Naturally, it is possible, for example, to select a different, greater thickness if protection is a more important factor than flexibility. It is also possible to vary the thickness of the material over the surface. This results in the possibility of offering additional protection only where it is desired, by providing a greater thickness of material, while where flexibility is required, for example at the instep of a shoe, there is no additional material, so that there is no adverse effect on the flexibility.

In addition to the fibres made from elastic materials, it is in principle possible to select numerous types of fibres for the support layer, for example synthetic fibres, such as polyamide fibres, and other standard textile fibres, such as cotton and the like. In an advantageous embodiment, the support layer comprises between 82% and 95% of fibres of a polyester material and between 18% and 5% of fibres of an elastic material. A support layer of this type has particularly good shape-restoring properties in combination with the required flexibility. Moreover, polyester material exhibits unexpectedly good adhesion to latex, so that the combination of polyester material as synthetic fibre for the support layer and latex for the compressible layer is of particular benefit.

At this point, it should be noted that throughout the entire document percentages relate to ratios by mass, unless expressly stated otherwise.

In principle, the support layer may be located either between the layer of leather material and the compressible layer or on that side of the compressible layer which is remote from the layer of leather material. It is preferable for the support layer to be situated between the layer of leather material and the layer of the compressible substance. This offers the advantage of providing better protection for the layer of leather material against excessive stresses. Particularly in the event of external influences, for example impacts against a hard object, the layer of leather material could be dented relatively deeply, with the result that it would be greatly stretched and therefore could tear, since it is so thin. As a result of the support layer being applied directly beneath the layer of leather material, for example by means of adhesive bonding using a breathable adhesive layer, an external pressure of this type is distributed over a larger area, so that the layer of leather material is better protected.

The mass per unit surface area of the support layer is not limited to any particular extent, although it is preferable for the support layer to have a mass per unit surface area of between 140 and 180 g/m². Within this range, a particularly favourable combination of an overall mass which is not excessively great and a favourable preponderance of the support layer over the layer of leather material is achieved. The intention of this measure is for the shape-restoring properties of the support layer not to be adversely affected, or to be only slightly adversely affected, by the specific resilience of the layer of leather material. Moreover, this level of mass per unit surface area is suitable for offering sufficient protection for the layer of leather material, as described above. If a slightly stronger, less flexible product is desired, it would be possible to select a slightly greater mass per unit surface area, for example 200–220 g/m².

The way in which the fibres in the support layer are interwoven may, for example, be in the form of a woven fabric. However, in the case of a woven fabric it is only possible to achieve sufficient elasticity if there is a large number of fibres made from an elastic material in at least one direction. It is preferable for the support layer to have a knitted structure. It is more preferable for the support layer to comprise a fabric having an embroidery structure, which is obtained by warping. By providing the support layer with a structure of this type, this layer is provided with its own flexibility and, above all, elasticity. Consequently, if desired the proportion of fibres of an elastic substance can be reduced, so that the support layer becomes less dependent on the further mechanical properties of the elastic substance.

In a preferred embodiment, the leather material comprises natural leather with a thickness of between 0.2 and 1.0 mm. Natural leather has an excellent combination of flexibility, elasticity, breathability and a good moisture balance. Moreover, natural leather satisfies the visual demands which are imposed on shoes and can be provided with virtually any desired colour.

It is preferable for the layer of natural leather to be between 0.4 and 0.6 mm thick, if large shoe parts are being produced, such as for example the entire shoe upper. For smaller parts, which may often be somewhat more flexible, thinner material, for example with a thickness of 0.2 mm, is also suitable.

The natural leather is advantageously selected from the grain layer of a hide. This offers the finest texture and, after tanning, the best flexibility. Nevertheless, a different layer, for example a suede layer from a deeper hide layer, is also possible. It is advantageous to select hair-sheep leather, preferably from small animals. This provides natural leather of optimum flexibility and elasticity. However, other types of animals, such as goats and sheep, are not ruled out.

In another attractive embodiment, the leather material comprises imitation leather, which comprises a layer of interwoven fibres of a polyester material and fibres of an elastic material. A layer of this type can be given an appearance which strongly resembles natural leather, with the breathability being retained and the elasticity even being slightly better. The imitation leather preferably comprises 92% of polyester and 8% elastane, and the density is approximately 260 g/m². This ratio and density ensures very good elasticity and strength. One example of a material of this type is "microfibre" material produced by Texpiel. Other ratios, between 88 and 93% of polyester, and a density between approximately 230 and 270 g/m² can be used where there are different demands with regard to elasticity or strength.

In an advantageous embodiment of the laminate material according to the invention, the layer of the compressible material is joined, on the side which is remote from the layer of leather material, over substantially its entire surface, to a lower support layer which can stretch in two directions. In this way, the layer of leather material is provided with still further protection against external influences, by an additional support layer on the underside of the compressible layer. Moreover, any influence acting on the compressible layer from the inside is better distributed over this layer. For example, in the case of shoe a deformity or a toe may exert an undesirably high pressure on the compressible layer. The lower support layer allows this pressure to be better distributed.

The lower support layer is advantageously composed of substantially the same fibres as the support layer, and the lower support layer has a mass per unit surface area of between 100 and 120 g/². In this way, use is made of the smallest possible number of different materials, with the result that there will be the smallest possible number of compatibility problems and it will be possible to control the mechanical properties very successfully. Moreover, the lower mass per unit surface area ensures that the lower support layer does not become too strong, so that in this way it is possible to prevent any excessive pressure on body parts or other objects covered by the laminate material. However, it is not necessary to select the same type of fibres if certain other demands imposed on the lower support layer are held to be of greater importance.

The leather material used often has a direction of maximum elasticity. The elasticity in a different direction, for example perpendicular to the direction of maximum elasticity, is then significantly lower. Advantageously, at least one out of the support layer and the lower support layer has a direction of maximum elasticity and a direction of lower elasticity which is perpendicular to the direction of maximum elasticity, the lower elasticity amounting to between 40 and 60% of the maximum elasticity. More advantageously, the lower elasticity is 50% of the maximum elasticity.

It is preferable for the direction of maximum elasticity of the support layer and/or the lower support layer to coincide with the direction of maximum elasticity of the leather material used. This orientation of directions of maximum elasticity imparts better stretching properties to the laminate material and offers a better distribution of pressure when the material is in use. In the present context, the term coinciding of the direction is intended to mean that the said directions include an angle which is less than 15°, preferable less than 5°.

In principle, the laminate material according to the invention is particularly suitable as a material for shoes, for example. In this case, in a number of situations a type of lining will still be fitted on the inner side. In a preferred embodiment of the laminate material, the lower layer also comprises, on the side which is remote from the layer of leather material, a covering layer of a water-absorbent material which can stretch in two directions. Partly, this layer may serve as a lining, as additional protection for the laminate material, but above all it can absorb moisture which is produced during use of the material and release it again. Particularly in the case of shoes and the like made from the laminate material according to the invention, there are considerable advantages involved in combining a moisture-absorbent lining layer of this type with the laminate material, for example by adhesive bonding using a breathable adhesive. This prevents any displacement of the layers with respect to one another. Suitable types of glues include, for example, MOR-AD 909 and MOR-AD 903-45 EA produced by Arly. These are polyurethane contact adhesives. They are eminently suitable for flexible substrates, such as leather and polyester foam.

The material of the covering layer can be selected from all suitable lining materials, but it is preferable for the covering layer to comprise a thin layer of leather material or a layer of fibres of a water-absorbent plastics material interwoven with elastic fibres. These materials have very suitable moisture-absorbing properties, while the mechanical and, in particular, elastic properties are very well matched to those of the other layers of the laminate material. The layer of leather material used may preferably be a layer of a similar type to the outermost layer of the laminate material, with a thickness preferably of between 0.2 and 0.6 mm. Since the visual requirements are much less important, while resistance to damage caused by friction is much more important, it is also possible to select a type of leather material which is matched to these demands but still has the required flexibility and elasticity.

The water-absorbent plastics material can in principle be selected from numerous such materials, such as viscose, ethylenevinyl acetate and the like, but it is advantageous for the water-absorbent plastics material to be a polyamide material. This material has the additional advantage that it is a material with a soft feel, causing relatively little inconvenience or damage to the skin on contact. This makes it a particularly suitable material for the covering layer for, for example, shoes and the like.

An embodiment in which polyamide material together with elastic fibres is selected for the support layer, if appropriate the lower support layer and the covering layer, has the advantage that it has a positive effect on the elastic properties. This embodiment is preferred over those with polyester fibres if elasticity is extremely important. A material of this type is used, for example, in small, stretchable components of, for example, a shoe.

In an advantageous embodiment, the covering layer comprises between 75% and 85% of fibres of polyamide material and between 25% and 15% of fibres of an elastic substance. This ratio provides the covering layer with very good flexibility and elasticity properties, while the moisture-absorbing capacity remains very good. The proportion of polyamide fibres is preferably 81–82%.

The covering layer advantageously has a mass per unit surface area of between 150 and 180 g/m$^2$, more advantageously of approximately 170 g/m$^2$. A mass per unit surface area of this type provides the covering layer with sufficient strength, flexibility, moisture-absorbent properties and also a sufficiently low weight.

The covering layer can be joined to the lower support layer in a wide range of ways. For example, it can be joined by adhesive bonding over the entire surface using a breathable adhesive. Preferably, however, the lower support layer is joined to the covering layer by means of flame-melting of a layer of spongy polyester material located between them. What this is intended to mean is that a layer of spongy polyester material is placed between the covering layer and the lower support layer of a layer of laminate material, the polyester material being partially melted by means of heating, for example with the aid of a flame. As a result, the polyester material can be joined to both the covering layer and the lower support layer.

Therefore, one advantage of this adhesive layer and associated method is that there is little if any risk of spots forming. Moreover, the spongy material also provides the overall laminate material with a certain extra softness.

The polyester material comprises substantially pure polyester material which is foamed to approximately 20 kg/m$^3$ for a starting thickness of approximately 2 mm. Naturally, this starting thickness is reduced during the flame-melting.

The above combination of layers, namely a layer of open-cell cured latex foam which is adhesively bonded on at least one side to a support layer comprising polyester fibres interwoven with fibres of an elastic substance is also inventive in itself. The combination of layers as described above, i.e. the laminate material according to the invention without the thin layer of leather material, may encompass all aspects as described above. Generally, it is advantageous for at least one support layer also to be joined to a layer comprising polyamide fibres interwoven with fibres of an elastic material. This combination offers a material which can provide the skin of body parts covered therewith with protection against shear forces which may occur in the event of movements. Moreover, it offers protection and is soft, flexible and breathable, and the layers exhibit unexpectedly good adhesion.

The invention also relates to a device for protecting a body part of a human or an animal, comprising a laminate material according to the invention.

In particular, a device of this type is selected from the group consisting of shoes, shin pads, knee pads, elbow pads and slings. A certain degree of flexibility and strength in combination with protection is important for all these examples. With regard to shin pads and knee pads and the like, consideration may be given not only to humans, but also to, for example, horses or other riding animals or pack animals. In particular, consideration should be given to products which are prescribed for a medical condition. In particular, diabetics, for example, have a skin which is very easily damaged and, moreover, particularly in the case of the legs and feet, has relatively little feeling. Consequently, chafing and pinching parts of shoes can quickly cause injuries which, moreover, are often difficult to heal. For these people, but also for people who have, for example, growths or other deformities on the foot, well-fitting and appropriate, i.e. flexible and protective, footwear is extremely important. Nevertheless, anyone can make use of the advantages of the invention, for example for more comfortable footwear.

The invention will be explained in more detail in the description of the figures which follows, with reference to the drawing, in which the only FIGURE shows a diagrammatic structure of a laminate material according to the invention.

The FIGURE shows, by way of non-limiting example, a diagrammatic cross section, through a laminate material according to the invention, comprising a layer of leather material I, a lower layer II and a lining layer III.

The layer of leather material I comprises a layer of leather 1.

The lower layer II comprises a layer of adhesive 2, a support layer 3, a layer of adhesive 4, a layer of compressible material 5, a layer of adhesive 6 and a lower support layer 7.

The lining layer III comprises a layer of polyester sponge 8 and a covering layer 9.

The layer of leather material I in this case comprises a layer of natural leather with a thickness of approximately 0.2 to 1.0 mm. The thickness is preferably approximately 0.2 mm to 0.6 mm. At this thickness, natural leather is sufficiently flexible and elastic for use in the laminate material according to the invention.

The natural leather comprises, for example, suede from goat's leather, and preferably the grain layer of hair-sheep leather. This is leather from a cross between a goat and a sheep, which is found in some Asian countries. This latter type of leather is characterized by an extremely high flexibility with a relatively fine implantation of hair, and therefore a fine surface. It is advantageous to select hides of small animals, which provides the leather with even further flexibility.

After the chrome-tanning of the hides, with a combination of oils selected for optimum flexibility of the leather, the leather is split to the desired thickness, preferably electronically. During the tanning, the initially parallel fibres start to "turn", i.e. they become increasingly interwoven with one another. Although this provides the leather with greater strength, it also looses some of its flexibility and elasticity. It has been found that this "turning" does not occur, or at least occurs to a much lesser extent, in the top layer, the grain layer. Therefore, it is preferable to select this grain layer for the leather which is used in the laminate material according to the invention.

The leather material is treated with an agent making it water-repellent. However, the leather material still remains breathable, i.e. water vapour can still be dissipated to the environment.

The layer of leather material I is secured to the lower layer II over substantially its entire surface by means of adhesive bonding using a layer 2 of breathable, self-binding adhesive gel.

The support layer 3 comprises, for example, a knitted fabric comprising 92% of polyester material and 8% of Lycra and having a mass per unit surface area of 160 g/m². This support layer 3 is in turn adhesively bonded over substantially its entire surface, by means of a layer 4 of breathable, self-binding adhesive gel, to a layer 5 of open-cell cured latex foam, although another soft, flexible and elastic substance may also be suitable. It is preferable for the latex to be a foamed natural latex with a density between 20 and 50 kg/m³, more preferably of approximately 30 kg/m³. The thickness of the layer is, for example, between 1 and 2 mm. If desired, the thickness of the layer may vary over the surface of the material, in order to provide a slightly greater strength where desired, by using a greater thickness, or to allow greater flexibility and freedom of movement by using a reduced thickness.

An antibacterial agent or an odour-suppressing agent, or a combination thereof, may be added to the latex material. The odour-suppressing agent is preferably selected to be carbon, in a ratio of 2% to 6% of carbon, remainder latex. The proportion of carbon is preferably approximately 4%. The antibacterial agent which is added if appropriate makes a negligible contribution to the weight and is not included when specifying the ratios.

The latex layer 5 is joined to the lower support layer 6 by means of yet another layer of breathable, self-binding adhesive gel, which is this time not illustrated. The adhesive gel is, for example, a hot-melt adhesive which is activated at a temperature of around 170° C.

The lower support layer 6 comprises, for example, substantially the same material as the support layer 3, except that in this case the mass per unit surface area is selected to be approximately 110 g/m².

By flame-melting of the polyester sponge 8, the lower layer II and the lining layer III, in particular the covering layer 9, are joined to one another. In the process, the polyester sponge is partially melted, resulting in an adhesive action which is able to join the two layers substantially without spots.

Finally, the covering layer 9 is in this case, for example, a knitted fabric comprising 81% of Polyamide and 19% of Lycra, with a mass per unit surface area of approximately 170 g/m².

EXAMPLES

A number of samples of the laminate material have been prepared, and subjected to tests in order to establish their elastic properties.

In the following Table the results are listed.

TABLE

| Sample number | I A | I B | II A | II B |
|---|---|---|---|---|
| Tensile properties Elasticity [N/mm] | | | | |
| direction X | 16.5 | 13.5 | 12.1 | 7.3 |
| direction Y | 15.4 | 10.7 | 8.7 | 7.8 |
| Elongation at break [%] | | | | |
| direction X | 85.6 | 30.6 | 74.3 | 78.5 |
| direction Y | 91.2 | 110.6 | 72.5 | 25.8 |
| Deformation resistance [%] | | | | |
| direction X | 3.8 | 5.0 | 6.0 | 7.3 |
| direction Y | 3.3 | 4.3 | 3.0 | 2.0 |

In the Table,
- 'I' indicates a laminate material comprising a leather layer, a Lycra support layer, a latex layer, and a lower support layer of Lycra. 'II' indicates a laminate layer comprising a leather layer and a Lycra support layer, hence without Latex or lower support layer.
- 'A' indicates that the leather layer had a thickness of 0.55±0.05 mm, and 'B' indicates that the leather layer had a thickness of 0.25±0.05 mm.
- The tensile properties have been measured according to a method based on Pr. EN.W.I.02.19.
- The deformation resistance was measured as the remaining elongation (with zero load) after the sample had been elongated by 15% for 1000 times.

The results indicate that, although the constant of elasticity increased when the leather-Lycra double layer was laminated to latex and the Lycra lower support layer, the total laminate material still has a useful elasticity and flexibility. Furthermore, the total laminate material showed increased tensile strength, because both the constant of elasticity and the elongation at break increased upon lamination to the latex/lower support layer. Also, the deformation resistance of the laminate material improved over the leather/Lycra double layer. All the above features indicate that the quality of the material for e.g. shoes improved remarkably, as it showed better shape retention properties and break resistance, while still having favourable elastic properties.

The invention claimed is:

1. A laminate material, comprising an upper layer and a lower layer which is joined to the upper layer over substantially the entire surface thereof, the upper layer comprising a thin layer with a thickness of between 0.2 and 1.0 mm of leather material, and the lower layer comprising a layer of material which can be stretched in two directions, wherein the lower layer comprises at least one support layer which can be stretched in two directions and comprises at least two sorts of interwoven fibres, at least one type of fibres being produced from an elastic substance, as well as a layer of a compressible substance that has been joined to the support layer over substantially the entire surface thereof and can be compressed in three mutually perpendicular directions, wherein the compressible substance comprises substantially open-cell, cured plastic foam.

2. The laminate material according to claim 1, wherein the plastic foam comprises latex foam.

3. The laminate material according to claim 2, wherein the open-cell cured latex foam has a density of between 25 and 35 kg/m$^3$.

4. The laminate material according to claim 1, wherein the layer which can be compressed in three mutually perpendicular directions has a thickness of between 0.5 and 2.5 mm.

5. The laminate material according to claim 1, wherein the support layer comprises between 82% and 95% of fibres of a polyester material and between 18% and 5% of fibres of an elastic material.

6. The laminate material according to claim 1, wherein the support layer comprises polyamide fibres.

7. The laminate material according to claim 1, wherein the support layer is situated between the layer of leather material and the layer of the compressible substance.

8. The laminate material according to claim 7, wherein the layer of the compressible material is joined over substantially its entire surface, on the side which is remote from the layer of leather material, to a lower support layer which can be stretched in two directions.

9. The laminate material according to claim 8, wherein the lower support layer is composed of substantially the same fibres as the support layer and has a mass per unit surface area of between 100 and 120 g/m$^2$.

10. The laminate material according to claim 1, wherein the support layer has a mass per unit surface area of between 140 and 180 g/m$^2$.

11. The laminate material according to claim 1, wherein the support layer has a knitted structure.

12. The laminate material according to claim 1, wherein the leather material comprises natural leather.

13. The laminate material according to claim 1, wherein the leather material comprises imitation leather which comprises a layer of interwoven fibres of a polyester material and fibres of an elastic material.

14. The laminate material according to claim 1, wherein at least one out of the support layer and the lower support layer has a direction of maximum elasticity and, perpendicular to this direction, a direction of lower elasticity, the lower elasticity amounting to between 40 and 60%, preferably 50%, of the maximum elasticity.

15. The laminate material according to claim 14, wherein the direction of maximum elasticity coincides with a direction of maximum elasticity of the leather material.

16. The laminate material according to claim 14, wherein the lower support layer is joined to the covering layer by means of flame-melting of a layer of spongy polyester material located between them.

17. The laminate material according to claim 1, wherein the lower layer, on the side remote from the layer of leather material also comprises a covering layer of a water-absorbent material, which can be stretched in two directions.

18. The laminate material according to claim 17, wherein the covering layer comprises a thin layer of leather material with a thickness of between 0.2 and 1.0 mm or a layer of fibres of a water-absorbent plastics material which are interwoven with elastic fibres.

19. The laminate material according to claim 17, wherein the water-absorbent plastics material is a polyamide material.

20. The laminate material according to claim 19, wherein the covering layer comprises between 75% and 85% of fibres of polyamide material and between 25% and 15% of fibres of an elastic substance.

21. The laminate material according to claim 17, wherein the covering layer has a mass per unit surface area of between 150 and 180 g/m$^2$.

22. A device for protecting a body part of a human or an animal, comprising a laminate material according to claim 1.

23. A device according to claim 22, wherein the device is selected from the group consisting of shoes, shin pads, knee pads, elbow pads and slings.

24. A laminate material, comprising a layer of open-cell cured latex foam which, on at least one side, is adhesively bonded to a support layer which comprises fibres of an elastic material which are interwoven with fibres selected from polyester and polyamide fibres, wherein at least the support layer is joined to a layer which includes fibers of an elastic material which are interwoven with polyamide fibres.

* * * * *